T. D. DOTTERER, OF CHARLESTON, SOUTH CAROLINA.

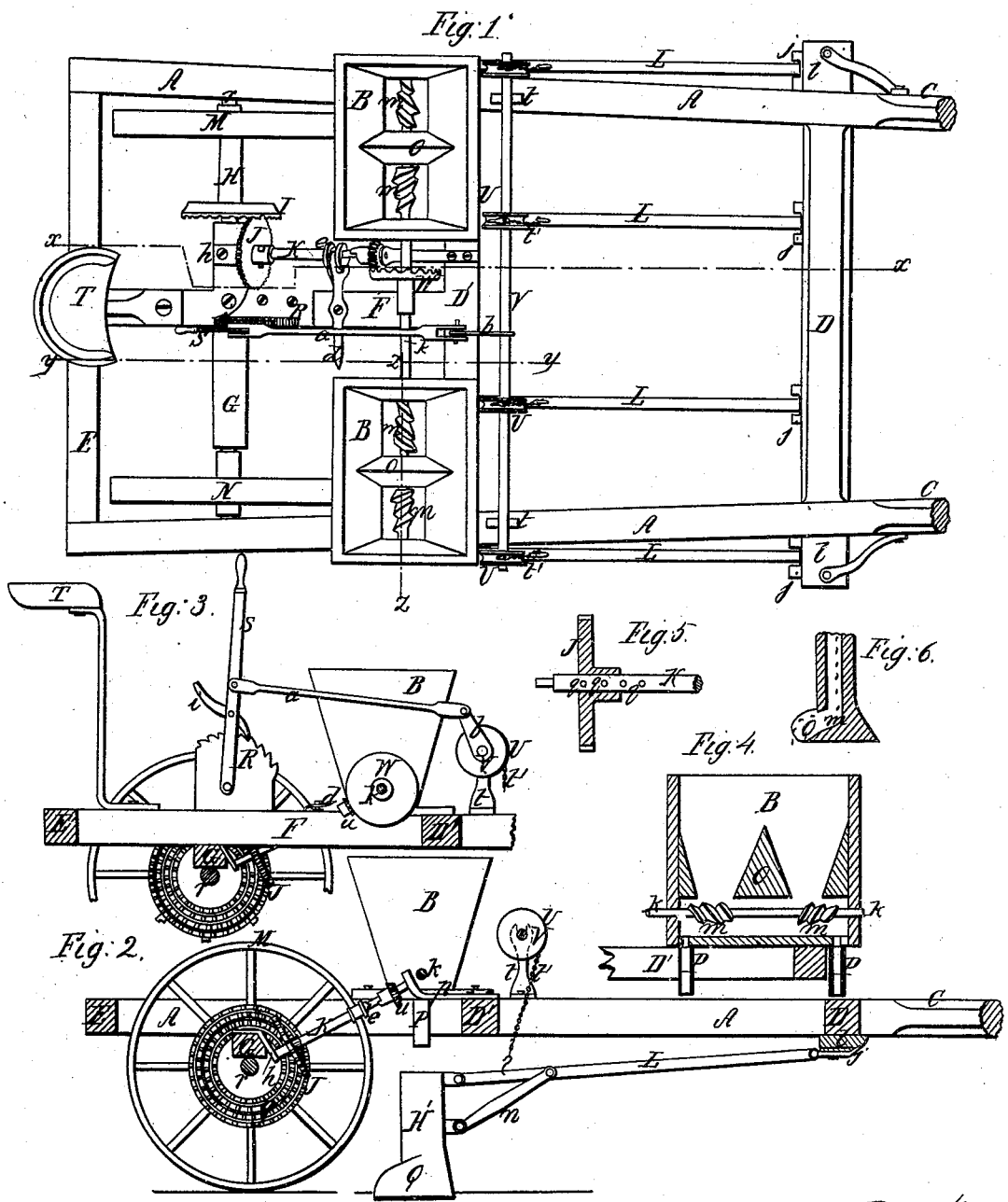

Letters Patent No. 85,574, dated January 5, 1869.

IMPROVEMENT IN MACHINE FOR SOWING RICE.

The Schedule referred to in these Letters Patent and making part of the same.

*To all whom it may concern:*

Be it known that I, T. D. DOTTERER, of Charleston, in the district of Charleston, and State of South Carolina, have invented new and useful Improvements in Rice-Sowing Machines; and I do hereby declare that the following is a full, clear, and exact description thereof, which will enable those skilled in the art to make and use the same, reference being had to the accompanying drawings, forming part of this specification, in which—

Figure 1 is a top view of my improved rice-sowing machine.

Figure 2 is a section of the same through the line *x x*, fig. 1.

Figure 3 is a detail section of the same through the line *y y*, fig. 1.

Figure 4 is a detail section through the line *z z*, fig. 1.

Figure 5 is a detail view of the adjustable pinion.

Figure 6 is a detail section of one of the trenching-plows.

Similar letters of reference indicate corresponding parts.

The object of this machine is to sow rice in a more perfect and effective manner, and consists of the mechanism and arrangement of the same, all of which will be duly set forth in the following.

The general frame of the machine consists of the side frames A A, affixed to cross-pieces E D' D, the prolongation of the side frames forming the shafts C C, as shown.

The draught-wheels M N revolve on an axle-rod, *r*, which latter is affixed below the side frames A A by means of lug-plates, similar to a hanging bearing. The rod, however, is rigid, and the wheels revolve upon it.

M is the drive-wheel, and the prolongation H of its hub-sleeve terminates in a gear-wheel, I, which is provided with several concentric-toothed rims *g*, cast upon its side, for the purpose of engaging with the pinion J, which latter is affixed on the shaft K by a pin.

This pin passes through a hole in the sleeve or hub of the pinion, and there being several holes in the shaft K to correspond to the several toothed rims *g*, the said pinion may be adjusted to engage with any one of the said rims, when it is desired to alter the speed of the feed-mechanism, which is driven by shaft K, as shown, for the said feed-mechanism consists of helical threads *m m m m*, revolving on and with the shaft *k*, which latter passes through the bottom of the hoppers B B B B.

These helical threads actuate the rice toward the upper orifices of the discharge-pipes P P P P, and govern the discharge of the rice, for the said discharge-pipes are immediately below the smaller ends of these helical threads.

The two threads of each hopper conduct the rice to the two pipes of each hopper, there being a partition, O, in each hopper, as shown, so that, by means of the said helical threads, the rice is made to discharge or sow into the trenches, in a uniform and equable manner.

When it is desirable to increase or diminish the discharge, the machine is stopped, and the pinion J is moved to another hole, *q*, on the shaft K. (See fig. 5.) The said pinion will then engage with another toothed rim, *g*, of the wheel I, and the feed of the threads *m* will be increased or diminished, according as the toothed rim is without or within the one which was previously in gear with the pinion J.

The trenching-plows consist of a hollow part, H', which is provided at the lower end with wings Q Q.

The rice falls from the pipes P into these trenching-plows, and, in falling, strikes against a scattering surface, *h'*, (see fig. 6,) and is scattered backward into the trench.

The wings Q serve to form this trench, and also to limit the scattering of the rice to the width of the trench.

The wings Q and the front of the lower end of the part H' combine to form a hoof-shaped trenching-plow, which forms the wide, shallow trench requisite for planting rice.

There are four of these plows, each of which is at the end of a link, L, as shown, the said links being hinged or pivoted by hinge-plates *j*, affixed to the cross-plank *l*, underneath the cross-bar D of the frame.

The draught-wheels are placed within side frames A of the machine, for the express purpose of enabling the outer plows to run near to the ditches, while the proximate wheel is at a sufficiently safe distance from the ditch.

The plows are braced by a link, *n*, connecting each plow with its hinge-link L, as shown.

The plows are lifted by chains *t'*, which are attached to the links L and to the wheel U, or any suitable sector, on a shaft, V, turning in uprights *t*, arising from the side frames A, as shown.

The shaft K, of the pinions J and *u*, has bearings in the plates *h* and *p*, the former being affixed to the axle-bolster G, which latter is affixed by a bolt to the axle-rod and the middle brace F of the frame, as shown.

The pinion *u* gears with the wheel W on the rod or shaft *k*, which bears the helical threads *m*, and thus communicates motion to the said threads.

The plows are lifted and lowered by means of a lever, S, connected, by a rod, *a*, with the arm *b* of the shaft V, bearing the chain-wheels U, as shown.

A ratchet-pawl, *i*, on the said lever, catches in a ratchet-sector, R, affixed to the middle brace F, as shown.

A clutch, *e*, operated by a lever, *d*, as shown, serves to throw the feeding-mechanism in gear with the shaft K.

The driver, sitting upon the seat T, can operate the clutch-lever $d$ with his foot, or the lever S with one hand, and so have the machine under complete control.

By means of this improved machine, I am enabled to sow rice with more perfect results, running near the ditch, and over any inequality in the ground, without interrupting the sowing of the rice, and scattering the rice evenly along the bottoms of the trenches in a manner conducive to good results.

I claim as new, and desire to secure by Letters Patent—

The combination and arrangement of the sleeve H, pinion I, bearing the series of concentric-toothed rings $g$, adjustable pinion J, inclined shaft K, pinion $u$, gear-wheel W, shaft $k$, bearing the two sets of helical threads $m$ in the hoppers, the plows H′, suspended by the bars L upon the cross-bar D of the frame, and operated by the chains $t'$, wheels U upon the shaft V, connecting-rod $a$, and adjustable lever S, as herein described, for the purpose specified.

T. D. DOTTERER.

Witnesses:
T. D. EASON,
JOSEPH LAMBLE.